US008954873B2

(12) United States Patent
Kitahashi

(10) Patent No.: US 8,954,873 B2
(45) Date of Patent: Feb. 10, 2015

(54) INFORMATION PROCESSING APPARATUS, INFORMATION PROCESSING METHOD AND COMPUTER READABLE MEDIUM

(75) Inventor: Tomoki Kitahashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 936 days.

(21) Appl. No.: 12/870,866

(22) Filed: Aug. 30, 2010

(65) Prior Publication Data

US 2011/0191705 A1 Aug. 4, 2011

(30) Foreign Application Priority Data

Feb. 3, 2010 (JP) ................. P2010-021804

(51) Int. Cl.
*G06F 3/00* (2006.01)
*G06F 3/048* (2013.01)
*G06F 3/0488* (2013.01)

(52) U.S. Cl.
CPC .............. *G06F 3/048* (2013.01); *G06F 3/0488* (2013.01)
USPC ............................ 715/764; 715/827; 715/863

(58) Field of Classification Search
USPC .......................................................... 715/863
See application file for complete search history.

(56) References Cited

U.S. PATENT DOCUMENTS

| | | | | |
|---|---|---|---|---|
| 6,049,390 A * | 4/2000 | Notredame et al. | .......... | 358/1.15 |
| 6,175,844 B1 * | 1/2001 | Stolin | ............................ | 715/210 |
| 7,051,289 B1 * | 5/2006 | Yoshida | ........................ | 715/784 |
| 7,098,896 B2 * | 8/2006 | Kushler et al. | ................. | 345/168 |
| 7,706,616 B2 * | 4/2010 | Kristensson et al. | .......... | 382/187 |
| 7,990,365 B2 * | 8/2011 | Marvit et al. | .................. | 345/156 |
| 8,291,348 B2 * | 10/2012 | Duarte et al. | .................. | 715/863 |
| 2005/0144256 A1 * | 6/2005 | Blumberg | ...................... | 709/217 |
| 2005/0172227 A1 * | 8/2005 | Feinberg | ........................ | 715/526 |
| 2006/0064647 A1 * | 3/2006 | Tapuska et al. | ................ | 715/800 |
| 2006/0136839 A1 * | 6/2006 | Makela | .......................... | 715/786 |
| 2007/0162878 A1 * | 7/2007 | Lee | ................................ | 715/864 |
| 2008/0077857 A1 * | 3/2008 | Olson | ............................ | 715/246 |
| 2008/0120576 A1 * | 5/2008 | Kariathungal et al. | ........ | 715/863 |
| 2008/0301578 A1 * | 12/2008 | Olson | ............................ | 715/802 |

(Continued)

FOREIGN PATENT DOCUMENTS

| | | | |
|---|---|---|---|
| JP | 06-167967 A | 6/1994 |
| JP | 6-266889 A | 9/1994 |

(Continued)

OTHER PUBLICATIONS

Office Action dated Sep. 3, 2013 issued by the Japanese Patent Office in counterpart Japanese Patent Application No. 2010-021804.

*Primary Examiner* — Ryan Pitaro
(74) *Attorney, Agent, or Firm* — Sughrue Mion, PLLC

(57) ABSTRACT

An information processing apparatus includes: a rule information output section that outputs rule information to a storage section in response to rule specifying operation for a screen on which display object information to be displayed is displayed, the rule information indicating a rule of altering enlarged-display portions one-by-one on the screen in the display object information; and a display content update section that updates content displayed on the screen in response to display content update operations sequentially accepted from a user so that the enlarged-display portions on the screen in the display object information alter one-by-one in order according to the rule indicated by the rule information when one of the enlarged-display portions is displayed on the screen.

16 Claims, 10 Drawing Sheets

(56) References Cited

U.S. PATENT DOCUMENTS

| | | | |
|---|---|---|---|
| 2010/0095240 A1* | 4/2010 | Shiplacoff et al. | 715/784 |
| 2010/0169766 A1* | 7/2010 | Duarte et al. | 715/244 |
| 2010/0174983 A1* | 7/2010 | Levy et al. | 715/243 |
| 2010/0251152 A1* | 9/2010 | Cho et al. | 715/765 |
| 2012/0026194 A1* | 2/2012 | Wagner et al. | 345/647 |

FOREIGN PATENT DOCUMENTS

| | | |
|---|---|---|
| JP | 2001-249746 A | 9/2001 |
| JP | 2003-122473 A | 4/2003 |
| JP | 2005-202062 A | 7/2005 |
| JP | 2007-072064 A | 3/2007 |
| JP | 2008-171356 A | 7/2008 |

* cited by examiner

INFORMATION PROCESSING APPARATUS, INFORMATION PROCESSING METHOD AND COMPUTER READABLE MEDIUM

CROSS-REFERENCE TO RELATED APPLICATIONS

This application is based on and claims priority under 35 USC 119 from Japanese Patent Application No. 2010-021804 filed on Feb. 3, 2010.

BACKGROUND

1. Technical Field

This invention relates to an information processing apparatus, an information processing method and a computer readable medium.

2. Related Art

There is proposed an art of enlarging a part of information for display on a screen so as to make the information easy to see.

SUMMARY

According to an aspect of the invention, an information processing apparatus includes: a rule information output section that outputs rule information to a storage section in response to rule specifying operation for a screen on which display object information to be displayed is displayed, the rule information indicating a rule of altering enlarged-display portions one-by-one on the screen in the display object information; and a display content update section that updates content displayed on the screen in response to display content update operations sequentially accepted from a user so that the enlarged-display portions on the screen in the display object information alter one-by-one in order according to the rule indicated by the rule information when one of the enlarged-display portions is displayed on the screen.

BRIEF DESCRIPTION OF THE DRAWINGS

Exemplary embodiment(s) of the present invention will be described in detail based on the following figures, wherein.

DETAILED DESCRIPTION

One exemplary embodiment of the invention will be discussed below in detail based on the accompanying drawings.

Figure 1:
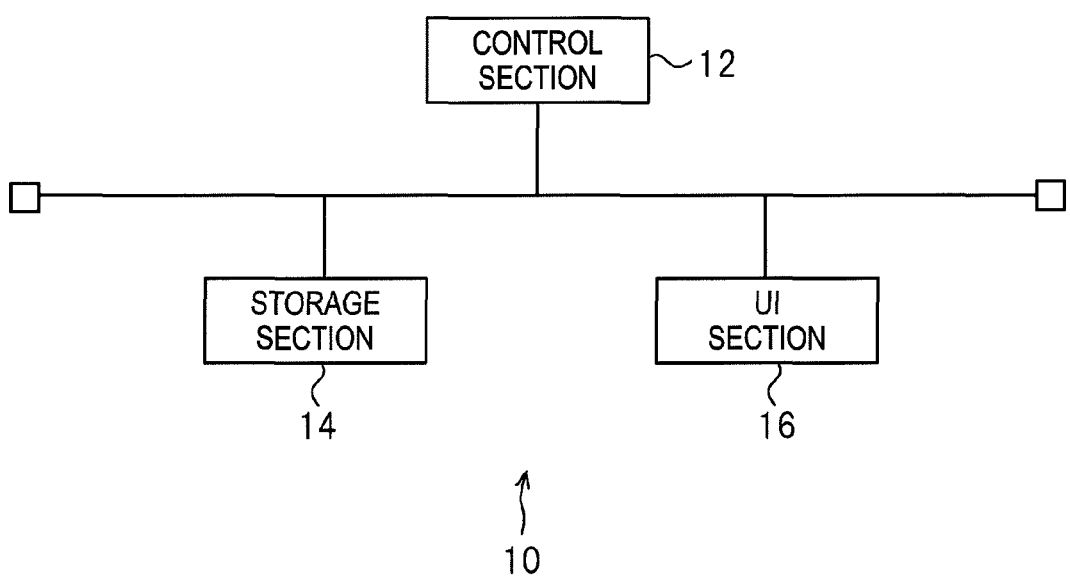
FIG. 1 is a hardware block diagram to show an example of the hardware configuration of an information processing apparatus according to an exemplary embodiment of the invention.
Figure 2:
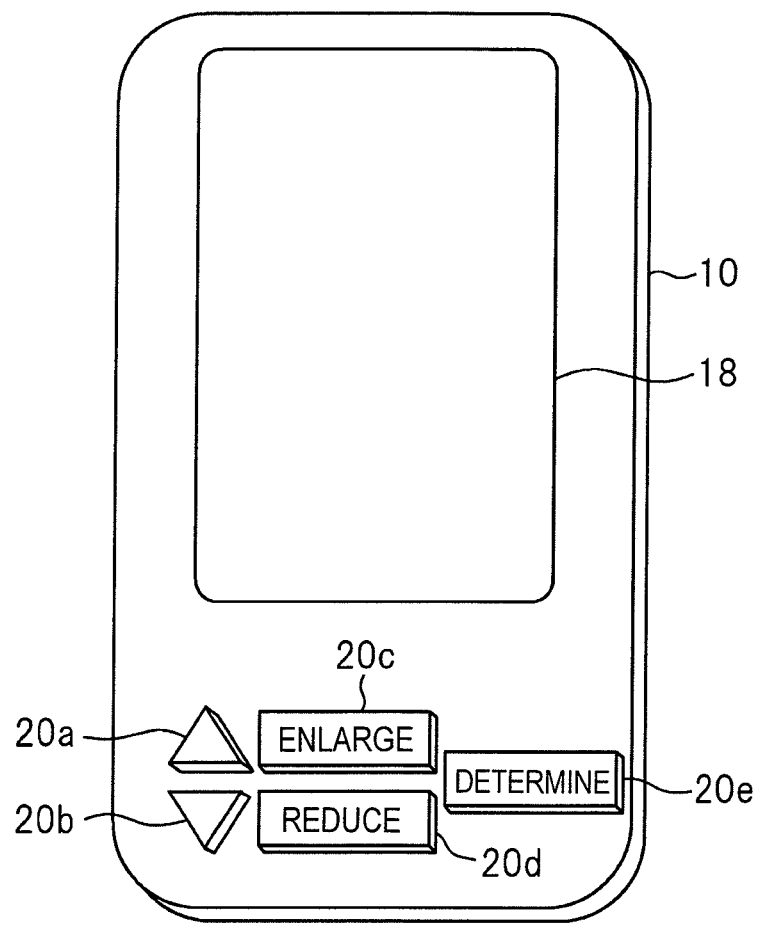
FIG. 2 is an external view to show an example of the appearance of the information processing apparatus illustrated in FIG. 1.

FIG. 1 is a hardware block diagram to show an example of the hardware configuration of an information processing apparatus 10 according to the exemplary embodiment of the invention. FIG. 2 is an external view to show an example of the appearance of the information processing apparatus 10 illustrated in FIG. 1. As shown in FIGS. 1 and 2, the information processing apparatus 10 according to the exemplary embodiment is, for example, a portable information terminal and includes a control section 12, a storage section 14, and a user interface (UI) section. The components are connected through a bus. The control section 12 is a program control device such as a CPU and operates in accordance with a program installed in the information processing apparatus 10. The storage section 14 is a storage device of ROM, RAM, etc., a hard disk, etc. Programs executed by the control section 12, etc., are stored in the storage section 14. The storage section 14 also operates as working memory of the control section 12. The UI section 16 outputs the content of operation performed by the user. The UI section 16 also displays information in accordance with a command input from the control section 12. In the exemplary embodiment the UI section 16 is made up of a screen of a touch panel, etc., and plural buttons 20 (an up button 20*a*, a down button 20*b*, an enlarging button 20*c*, a reducing button 20*d*, and a determining button 20*e*). The touch panel 18 sequentially detects contact of an object such as a finger of the user and a stylus, on a detection face at predetermined time intervals. When detecting contact of the object, the touch panel 18 detects the contact position of the object.

Figure 3:
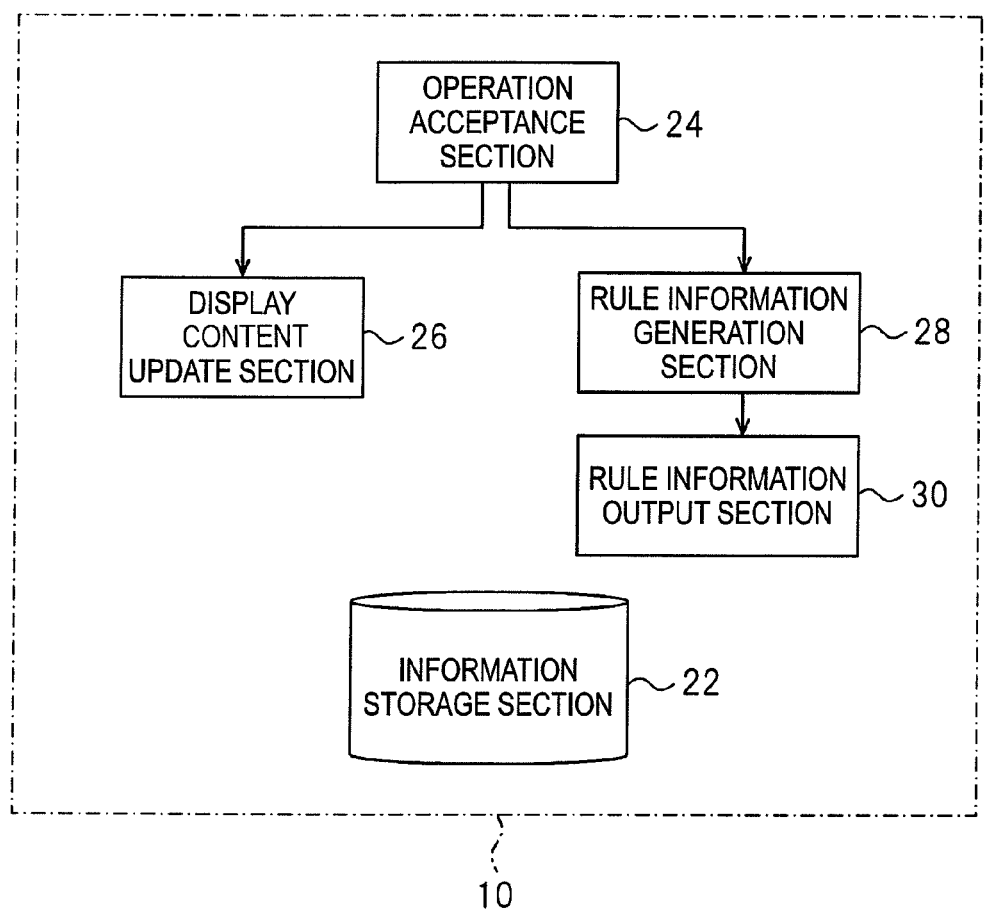
FIG. 3 is a function block diagram to show an example of the functions implemented by the information processing apparatus according the exemplary embodiment of the invention.

FIG. 3 is a function block diagram to show an example of the functions implemented by the information processing apparatus 10 according the exemplary embodiment of the invention. As illustrated in FIG. 3, in the exemplary embodiment, for example, the information processing apparatus 10 includes an information storage section 22, an operation acceptance section 24, a display content update section 26, a rule information generation section 28, and a rule information output section 30. The information storage section 22 is mainly implemented as the storage section 14. Other components are mainly implemented as the control section 12.

The components are implemented as the control section 12 of the information processing apparatus 10 executes the programs installed in the information processing apparatus 10 of a computer. The programs are supplied to the information processing apparatus 10, for example, through a computer-readable information transmission medium of a CD-ROM, a DVD-ROM, etc. or communication means of the Internet, etc.

The information storage section 22 stores display object information to be displayed on the UI section 16 of the touch panel 18, etc. In the exemplary embodiment, the information storage section 22 stores document information 32 indicating a document with a part divided into two columns illustrated in FIG. 4, for example.

The operation acceptance section 24 accepts operation of the user for the UI section 16 of the touch panel, the button, etc. The display content update section 26 updates the content displayed on a screen of the touch panel 18, etc., in response to the operation accepted by the operation acceptance section 24.

The display content update section 26 updates the content displayed on a screen of the touch panel 18, etc., in response to the operation accepted by the operation acceptance section 24. For example, the display content update section 26 updates the display content of the touch panel 18 so that the document information 32 displayed on the touch panel 18 is enlarged (or reduced) for display and updates the display content of the touch panel 18 so that when one of portions in the document information 32 is enlarged on the touch panel 18, the one of portions in the document information 32 alters to another one of portions in the document information 32.

The rule information generation section 28 generates rule information indicating a rule for altering the portions in the document information 32 being enlarged one-by-one on the touch panel 18 for the display content update section 26.

The rule information output section 30 outputs the rule information generated by the rule information generation section 28 to the information storage section 22. Thus, in the exemplary embodiment, the information storage section 22 stores the rule information.

Figure 4:
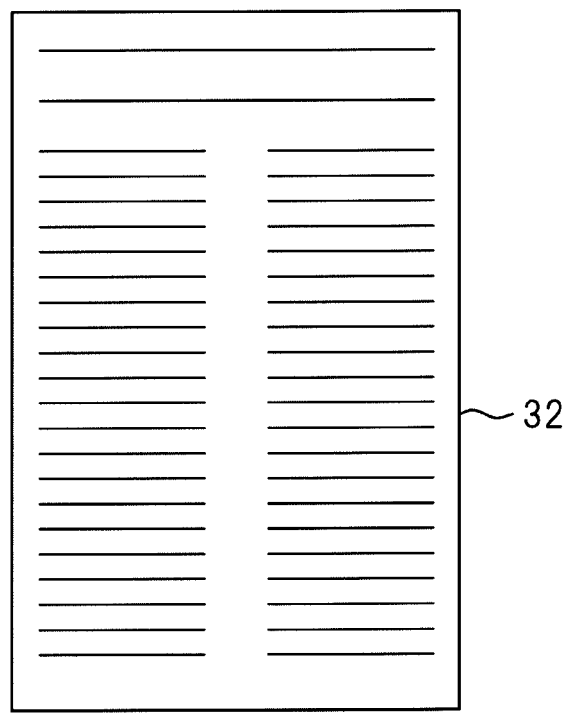
FIG. 4 is a drawing to show an example of document information.
Figure 5:
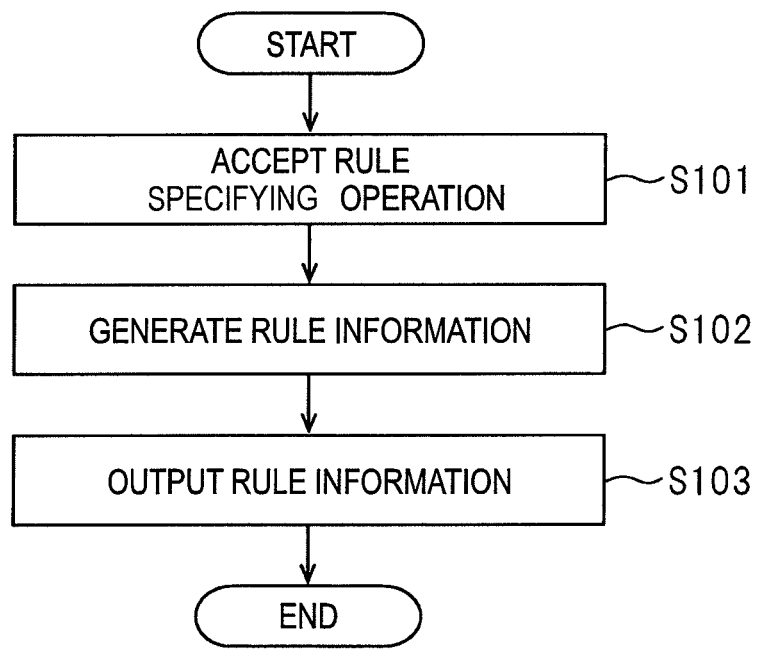
FIG. 5 is a flowchart to show an example of a flow of processing performed in the information processing apparatus according to the exemplary embodiment of the invention.

Here, an example of output processing of the rule information performed in the information processing apparatus 10 according to the exemplary embodiment will be discussed with reference to a flowchart of FIG. 5. In the processing example, it is assumed that the document information 32 illustrated in FIG. 4 is stored in the information storage section 22 and that the entire content of the document information 32 is previously displayed on the touch panel 18.

Figure 6:
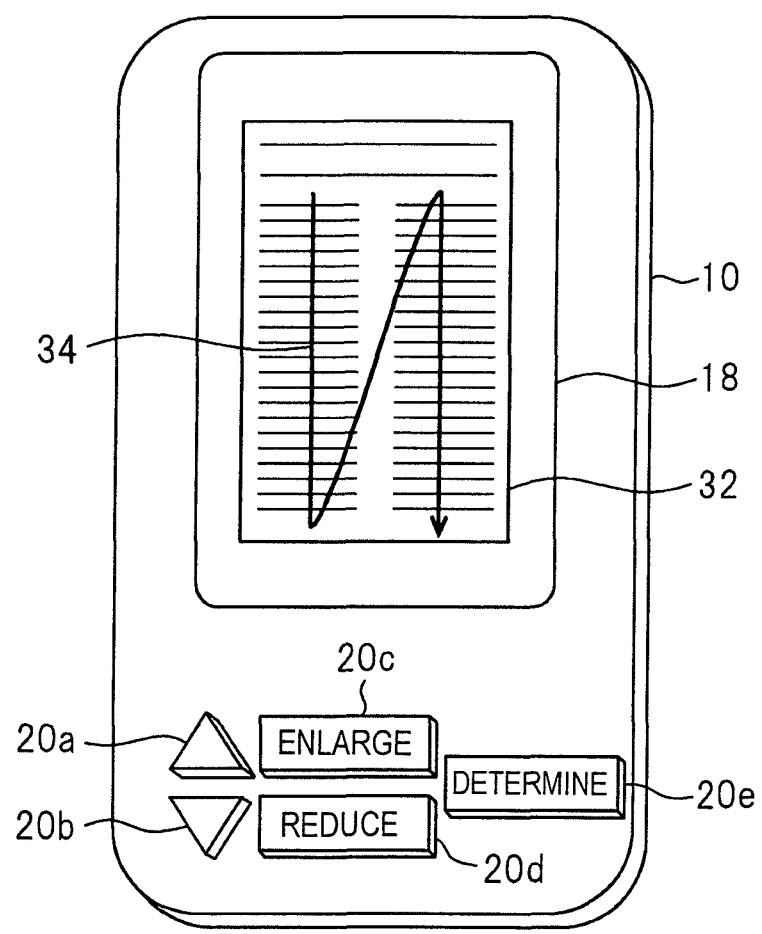
FIG. 6 is a drawing to show an example of how to accept a rule specifying operation.
Figure 7:
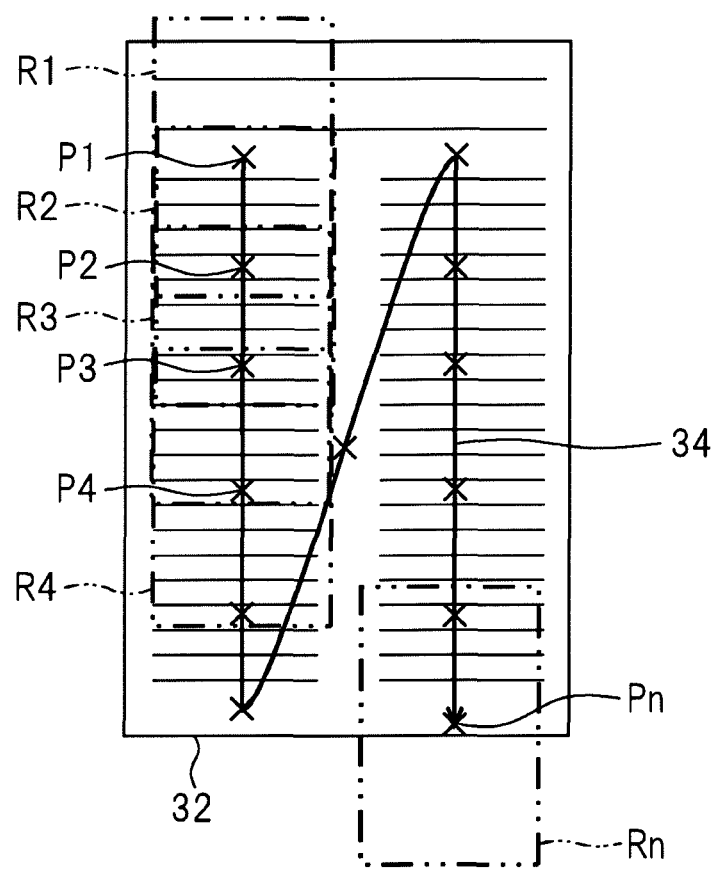
FIG. 7 is a drawing to show an example of document information.

To begin with, the operation acceptance section 24 accepts a rule specifying operation specifying the rule indicated by the rule information from the user (S101). FIG. 6 is a drawing to show an example of how to accept the rule specifying operation in a state in which the entire content of the document information 32 is displayed on the touch panel 18. In the processing example, tracing operation on the touch panel 18 using an object such as a stylus, along a specified line 34 from the upper left of the touch panel 18 through the lower left and the upper right to lower right is accepted from the user. In the exemplary embodiment, the touch panel 18 detects the contact positions of the object in the touch panel 18 at predetermined time intervals. The operation acceptance section 24 sequentially acquires information of the contact positions detected by the touch panel 18 at predetermined time intervals. The operation acceptance section 24 sequentially determines coordinate values (P1, P2, . . . Pn) of positions on the document information 32 corresponding to the contact positions (see FIG. 7). The operation acceptance section 24, for example, increases the coordinate values of the contact positions on the touch panel 18 at a predetermined enlargement ratio and calculates the coordinate values (P1, P2, . . . Pn) of the positions on the document information 32. FIG. 7 is a drawing to show an example of the document information 32 with which the specified line 34 specified by the rule specifying operation is associated. In the processing example, the coordinate value of the position at which the user starts to bring the object (stylus) into contact with the touch panel 18 is P1 and the position at which the user terminates bringing the object into contact with the touch panel 18 (the position at which the user releases the object) corresponds to Pn. The operation acceptance section 24 may determine the enlargement ratio based on the distance between the adjacent contact positions on the touch panel 18 (for example, average value of the distances), for example. The operation acceptance section 24 may increase the coordinate values of the contact positions at the determined enlargement ratio and may calculate the coordinate values (P1, P2, . . . Pn) of the positions on the document information 32.

The rule information generation section 28 generates rule information responsive to the rule specifying operation (S102). In the processing example, rule information of associating the coordinate values (P1, P2, . . . Pn) determined in the processing shown at S101 with the order associated with the coordinate values (1, 2, . . . n) is generated. The rule information output section 30 outputs the rule information generation in the processing shown at S102 to the information storage section 22 (S103).

Thus, the rule information output section 30 outputs the rule information indicating a rule of altering enlarged-display portions in the document information 32 in response to the rule specifying operation for the screen where the document information 32 is displayed.

Figure 8:
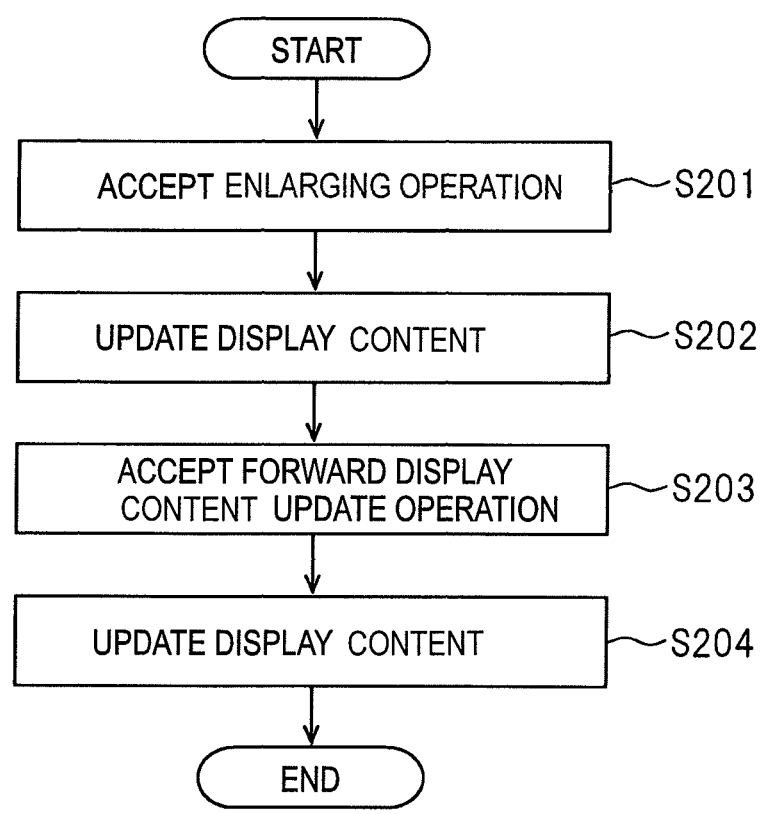
FIG. 8 is a flowchart to show an example of a flow of processing performed in the information processing apparatus according to the exemplary embodiment of the invention.

Next, an example of display content update processing performed in the information processing apparatus 10 according to the exemplary embodiment will be discussed with reference to a flowchart of FIG. 8. In the processing example, it is assumed that the rule information output to the information storage section 22 in the processing shown at S101 to S103 described above is previously stored in the information storage section 22.

Figure 9:
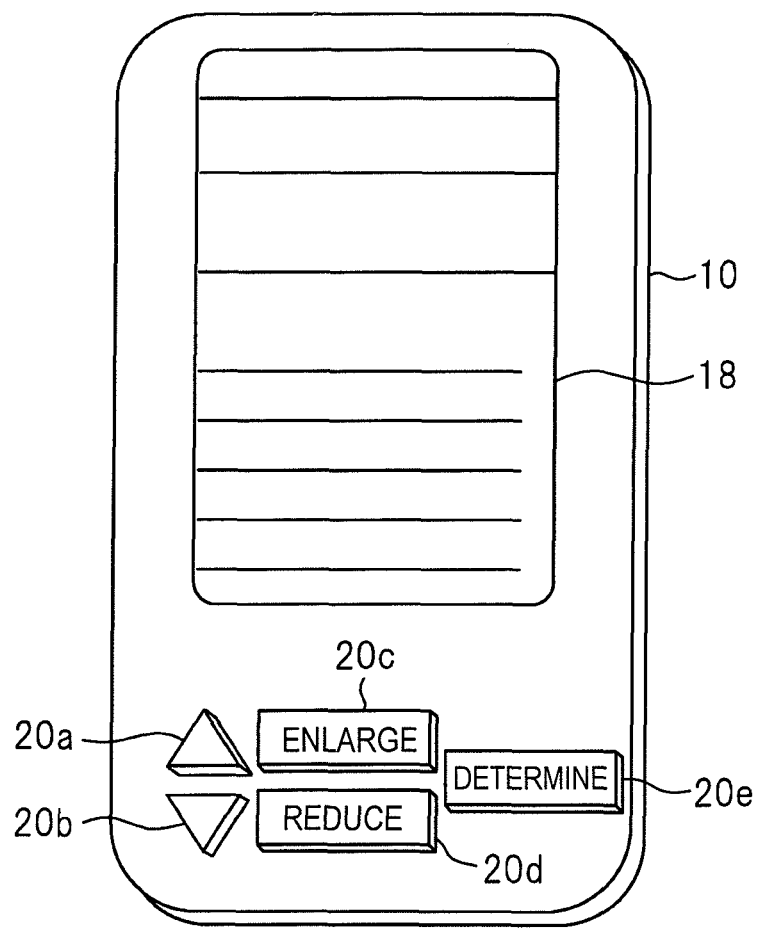
FIG. 9 is a drawing to show an example in which an area R1 is enlarged on a touch panel.

To begin with, the operation acceptance section 24 accepts an enlarging operation (in the exemplary embodiment, for example, press operation of the enlarging button 20c) from the user (S201). Then, the display content update section 26 enlarges the document information 32 at a predetermined enlargement ratio (or the enlargement ratio determined as described above) so that an area R1 is enlarged on the touch panel. The area R1 is displayed to have a center position which indicates a position on the document information 32 corresponding to a coordinate value P1 associated with the first order (order 1) contained in the rule information (coordinate value P1 of the position in the document information 32 corresponding to the start point of the specified line 34). Thus, the display content update section 26 updates the display content of the touch panel 18 (S202). FIG. 9 is a drawing to show an example in which the area R1 is enlarged on the touch panel 18.

The operation acceptance section 24 accepts a forward display content update operation (in the exemplary embodiment, for example, press operation of the down button 20b) from the user (S203). Then, the display content update section 26 updates the display content of the touch panel 18 so that an area R2 with the position on the document information 32 corresponding to a coordinate value P2 associated with order 2 contained in the rule information as the center is displayed on the touch panel 18 (S204).

Whenever the operation acceptance section 24 accepts the forward display content update operation in order, the display content update section 26 updates the display content of the touch panel 18 so that an area (R3, R4, . . . Rn) with the position on the document information 32 corresponding to a coordinate value (P3, P4, . . . Pn) associated with the next order (3, 4, . . . n) contained in the rule information as the center is displayed on the touch panel 18.

Thus, the display content update section 26 updates the description displayed on the touch panel 18 so that the enlarged-display portions in the document information 32 alter in order (for example, the enlarged-display portions alter following the specified line 34 in order) in accordance with the rule indicated by the rule information stored in the information storage section 22 (for example, the order of the positions indicated by the rule information) in response to the display content update operation accepted in order from the user when a part of the document information 32 is enlarged on the touch panel 18. The display content update section 26 may update the description displayed on the touch panel 18 so that the enlarged-display portions in the document information overlap before and after update of the displayed description.

When the area Rn with the coordinate value Pn indicating the position of the termination of the specified line 34 as the center is enlarged on the touch panel 18, if the operation acceptance section 24 accepts the forward display content update operation, the display content update section 26 may suppress update of the display content of the touch panel 18.

Whenever the operation acceptance section 24 accepts backward display content update operation (in the exemplary embodiment, for example, press operation of up button 20a) in order from the user, the display content of the touch panel 18 is updated so that the position in the document information 32 corresponding to the coordinate value of the previous order, contained in the rule information is displayed at the center of the touch panel 18.

When the operation acceptance section 24 accepts a reducing operation (in the exemplary embodiment, for example, press operation of the reducing button 20d) from the user, the display content of the touch panel 18 is updated so that the document information 32 is reduced on the touch panel 18 at a predetermined reduction ratio.

The invention is not limited to the exemplary embodiment described above.

For example, the rule information generated by the rule information generation section 28 is not limited to that described above. The rule information generation section 28 may generate rule information corresponding to the coordinate value of each point along the specified line 34 according to a different method from the method described above. For example, the rule information generation section 28 may generate rule information of associating the coordinate values (P1, P2, . . . Pn) of the points separated at a predetermined interval on the specified line 34 with the order along the specified line 34 (1, 2, . . . n).

Figure 10:
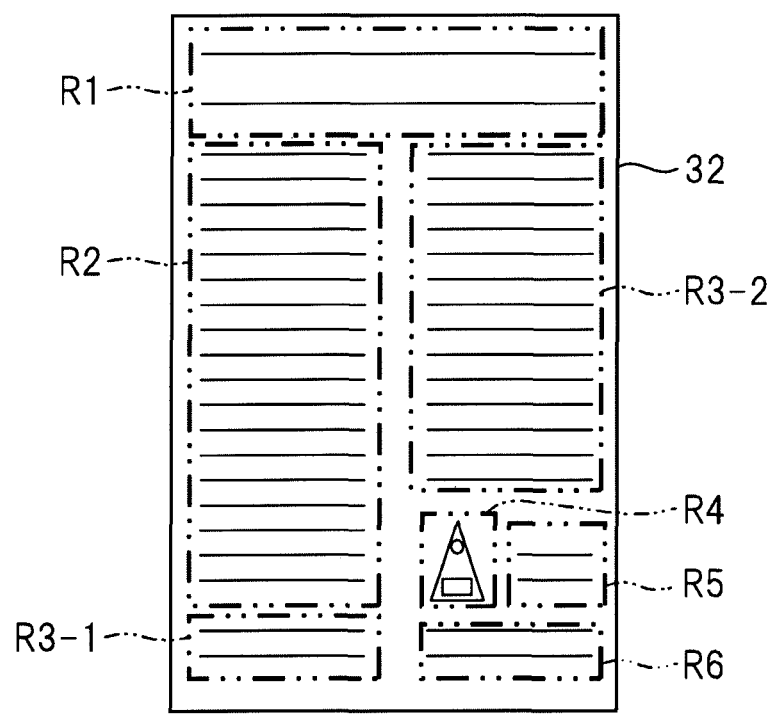
FIG. 10 is a drawing to show an example of document information.

The operation acceptance section 24 may accept a rule specifying operation different from the operation traced on the touch panel 18. For example, plural areas (R1, R2, . . . Rn) may be defined in the document information 32 as shown in FIG. 10. At this time, areas at a distance from each other (R3-1 and R3-2) may be handled as one area (R3) as shown in FIG. 10. In this case, the operation acceptance section 24 may accept contact operation in which the user sequentially brings the object into contact with the touch panel 18 at positions on the touch panel 18 corresponding to the positions of the areas. The rule information generation section 28 may generate rule information of associating the areas (R1, R2, . . . Rn) with the order in which the contact operation is performed (1, 2, . . . n). When the operation acceptance section 24 accepts the enlarging operation from the user, the display content update section 26 may enlarge the document information 32 so that the whole area R1 in the document information 32 associated with order 1 is displayed on the touch panel 18. When enlarging the area R3 on the touch panel 18, the display content update section 26 may display the document information 32 in the area R3-1 in the upper part of the touch panel 18 and display the document information 32 in the area R3-2 in the lower part of the touch panel 18.

Whenever the operation acceptance section 24 accepts forward display content update operation from the user, the display content update section 26 may update the display content of the touch panel 18 so that the whole area (R2, R3, . . . Rn) associated with the next order (2, 3, . . . n) contained in the rule information is enlarged on the touch panel 18.

The operation acceptance section 24 accepts tracing operation more than once until accepting enlarging operation and when the operation acceptance section 24 accepts the enlarging operation, the rule information generation section 28 may generate rule information based on plural specified lines 34.

The operation acceptance section 24 accepts operation in which the user brings the object into contact with the touch panel 18 at different points on the touch panel 18 more than once until the operation acceptance section 24 accepts the enlarging operation and when the operation acceptance section 24 accepts the enlarging operation, the rule information generation section 28 may determine specified lines 34 corresponding to a line from the coordinate value of the first accepted point to the coordinate value of the second accepted point, a line from the coordinate value of the third accepted point to the coordinate value of the fourth accepted point, . . . and may generate rule information based on the specified lines 34.

If the specified line 34 contains a bend portion at a smaller angle (shaper angle) from a predetermined angle, the rule information generation section 28 may exclude the bend portion from the generation target of rule information.

Whenever the operation acceptance section 24 accepts the enlarging operation, the display content update section 26 may enlarge the document information 32 in order at a predetermined enlargement ratio. When the operation acceptance section 24 accepts determination operation (for example, press operation of the determining button 20e), enlargement ratio information indicating the enlargement ratio of the document information 32 at the time when the determination operation is accepted may be generated. After this, if the operation acceptance section 24 accepts enlarging operation, the display content update section 26 may enlarge the document information 32 on the touch panel 18 at the enlargement ratio indicated by the enlargement ratio information. In this case, the operation acceptance section 24 recalculates the coordinate values (P1, P2, . . . Pn) of positions on the document information 32 and the coordinate values of positions of the areas (R1, R2, . . . Rn). Thus, the display content update section 26 may enlarge the document information 32 on the touch panel 18 at the enlargement ratio specified by the user.

The information processing apparatus 10 may previously execute image processing of character recognition processing, etc., for the document information 32 and may determine an area in the document information 32 where a character is placed. When the operation acceptance section 24 accepts enlarging operation, the display content update section 26 may enlarge the area in the document information 32 where the character is placed with the coordinate value indicated by rule information as the center on the touch panel 18. For example, the display content update section 26 may enlarge the document information 32 on the touch panel 18 so that the width of the first column of the document information 32 divided into two columns corresponds to the width of the touch panel 18.

The document information 32 may be made up of plural pages. The rule information generation section 28 may generate rule information based on contact operation with the touch panel 18 on which any one page is displayed. When the operation acceptance section 24 accepts forward display content update operation from the user in a situation in which the area Rn with the position on the document information 32 corresponding to the coordinate value Pn associated with the last order n as the center is displayed on the touch panel 18, the display content update section 26 may update the display content of the touch panel 18 so that the whole area R1 in the document information 32 associated with the first order (order 1) of document information of the next page is enlarged on the touch panel 18. Thus, the display content update section 26 may update the display content of the touch panel 18 so that the enlarged-display portions in the document information 32 alter in order in accordance with the rule indicated by the rule information about each page of the document information 32.

The position relationship between the position on the document information 32 corresponding to the coordinate value contained in the rule information and the area in the document information 32 to be enlarged is not limited to the example described above. For example, the display content update section 26 may enlarge the document information 32 at a predetermined enlargement ratio so that the area where the position on the document information 32 corresponding to the coordinate value contained in the rule information becomes the upper left end is enlarged on the touch panel 18.

Whenever the display content update section 26 updates the display content of the touch panel 18, the enlargement ratio at which the document information 32 is enlarged may change.

The operation acceptance section 24 may accept operation of tracing with an object such as a stylus, from an up part to a down part along the longitudinal direction of the touch panel, accepted when the document information 32 is enlarged on the touch panel 18 as forward display content update operation and may accept operation of tracing with an object such as a stylus, from a down part to an up part as backward display content update operation.

The exemplary embodiment may be applied to general information other than the document information 32 displayed on a screen of the touch panel 18, etc. The exemplary embodiment may be applied to an information processing apparatus other than the portable information terminal.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a rule information output section that outputs rule information to a storage section in response to a rule specifying operation for a screen on which display object information to be displayed is displayed, the rule information indicating a rule of displaying on the screen specified portions of the display object information in an enlarged manner in a specified sequence; and
a display content update section that, using a processor, updates content displayed on the screen in response to display content update operations sequentially accepted from a user so that portions of the display object information specified in the rule indicated by the rule information are enlarged and displayed on the screen in a sequence specified in the rule indicated by the rule information, wherein:
the rule information output by the rule information output section to the storage section corresponds to a line on the display object information specified as the user traces on the screen,
the display content update section, in response to a forward display content update operation, updates the content displayed on the screen such that a next portion of the display object information along the line in the sequence specified in the rule indicated by the rule information and corresponding to the sequence defined by the tracing of the line on the screen is enlarged and displayed on the screen, and
the display content update section updates the content displayed on the screen so that the portion of the display objects information to be enlarged and displayed is displayed on the screen at an enlargement ratio specified by the user in response to an enlarging operation accepted from the user.

2. The information processing apparatus according to claim 1,
wherein the rule information output by the rule information output section further corresponds to positions on the display object information indicated by information acquired in order at a predetermined time interval when the user traces on the screen, and
the display content update section updates the content displayed on the screen so that the portion of the display object information surrounding each of the positions is enlarged and displayed on the screen in the sequence defined by the order of the positions.

3. The information processing apparatus according to claim 1,
wherein the display object information corresponds to one page of document information containing a plurality of pages, and
the display content update section updates the content displayed on the screen so that the portions of the display object information are enlarged and displayed on the screen according to the rule indicated by the rule information for each page of the document information.

4. The information processing apparatus according to claim 1,
wherein the rule information output by the rule information output section further contains information indicating an end position corresponding to a final portion of the display object to be enlarged and displayed on the screen to the storage section, and
upon acceptance of the display content update operation while the final portion of the display object to be enlarged and displayed is displayed on the screen, the display content update section does not update the content displayed on the screen.

5. An information processing apparatus comprising:
a rule information output section that outputs rule information to a storage section in response to a rule specifying operation for a screen on which display object information to be displayed is displayed, the rule information indicating a rule of displaying on the screen specified portions of the display object information in an enlarged manner in a specified sequence; and
a display content update section that, using a processor, updates content displayed on the screen in response to display content update operations sequentially accepted from a user so that portions of the display object information specified in the rule indicated by the rule information are enlarged and displayed on the screen in a sequence specified in the rule indicated by the rule information, wherein:

the rule information output by the rule information output section to the storage section corresponds to a line on the display object information specified as the user traces on the screen.

the display content update section in response to a forward display content update operation, updates the content displayed on the screen such that a next portion of the display object information along the line in the sequence specified in the rule indicated by the rule information and corresponding to the sequence defined by the tracing of the line on the screen is enlarged and displayed on the screen, the rule information output by the rule information output section further corresponds to ordered positions in the display object information, and the display content update section updates the content displayed on the screen so that the portion of the display object information surrounding each of the ordered positions is enlarged and displayed on the screen in the sequence defined by the order of the positions.

6. The information processing apparatus according to claim 5, wherein the rule information output by the rule information output section further contains information indicating an end position corresponding to a final portion of the display object to be enlarged and displayed on the screen to the storage section, and upon acceptance of the display content update operation while the final portion of the display object to be enlarged and displayed is displayed on the screen, the display content update section does not update the content displayed on the screen.

7. The information processing apparatus according to claim 5, wherein the display object information corresponds to one page of document information containing a plurality of pages, and the display content update section updates the content displayed on the screen so that the portions of the display object information are enlarged and displayed on the screen according to the rule indicated by the rule information for each page of the document information.

8. The information processing apparatus according to claim 5, wherein the rule information output by the rule information output section further corresponds to positions on the display object information indicated by information acquired in order at a predetermined time interval when the user traces on the screen, and the display content update section updates the content displayed on the screen so that the portion of the display object information surrounding each of the positions is enlarged and displayed on the screen in the sequence defined by the order of the positions.

9. A non-transitory computer readable medium storing a program causing a computer to execute a process for displaying information on a screen, the process comprising:

outputting rule information to a storage section in response to a rule specifying operation for a screen on which display object information to be displayed is displayed, the rule information indicating a rule of displaying on the screen specified portions of the display object information in an enlarged manner in a specified sequence and corresponding to a line on the display object information specified as a user traces on the screen;

updating content displayed on the screen in response to display content update operations sequentially accepted from the user so that portions of the display object information specified in the rule indicated by the rule information are enlarged and displayed on the screen in a sequence specified in the rule indicated by the rule information; and in response to a forward display content update operation, updating the content displayed on the screen such that a next portion of the display object information along the line in the sequence specified in the rule indicated by the rule information and corresponding to the sequence defined by the tracing of the line on the screen is enlarged and displayed on the screen, wherein in the updating the content displayed on the screen, the portion of the display object information to be enlarged and displayed is displayed on the screen at an enlargement ratio specified by the user in response to an enlarging operation accepted from the user.

10. The non-transitory computer readable medium according to claim 9, wherein the rule information further corresponds to positions on the display object information indicated by information acquired in order at a predetermined time interval when the user traces on the screen, and the content displayed on the screen is updated so that the portion of the display object information surrounding each of the positions is enlarged and displayed on the screen in the sequence defined by the order of the positions.

11. The non-transitory computer readable medium according to claim 9, wherein the display object information corresponds to one page of document information containing a plurality of pages, and the content displayed on the screen is updated so that the portions of the display object information are enlarged and displayed on the screen according to the rule indicated by the rule information for each page of the document information.

12. The non-transitory computer readable medium according to claim 9, wherein the rule information further contains information indicating an end position corresponding to a final portion of the display object to be enlarged and displayed on the screen, and upon acceptance of the display content update operation while the final portion of the display object to be enlarged and displayed is displayed on the screen, the content displayed on the screen is not updated.

13. A non-transitory computer readable medium storing a program causing a computer to execute a process for displaying information on a screen, the process comprising:

outputting rule information to a storage section in response to a rule specifying operation for a screen on which display object information to be displayed is displayed, the rule information indicating a rule of displaying on the screen specified portions of the display object information in an enlarged manner in a specified sequence and corresponding to a line on the display object information specified as a user traces on the screen;

updating content displayed on the screen in response to display content update operations sequentially accepted from the user so that portions of the display object information specified in the rule indicated by the rule information are enlarged and displayed on the screen in a sequence specified in the rule indicated by the rule information; and in response to a forward display content update operation, updating the content displayed on the screen such that a next portion of the display object information along the line in the sequence specified in the rule indicated by the rule information and corresponding to the sequence defined by the tracing of the line on the screen is enlarged and displayed on the screen, wherein in the outputting rule information, the rule information further corresponds to ordered positions in the display object information, and wherein in the updating content displayed on the screen, the portion of the display object information surrounding each of the ordered positions is enlarged and displayed on the screen in the sequence defined by the order of the positions.

14. The non-transitory computer readable medium according to claim 13, wherein the rule information further corresponds to positions on the display object information indicated by information acquired in order at a predetermined time interval when the user traces on the screen, and the content displayed on the screen is updated so that the portion of the display object information surrounding each of the positions is enlarged and displayed on the screen in the sequence defined by the order of the positions.

15. The non-transitory computer readable medium according to claim 13, wherein the display object information corresponds to one page of document information containing a plurality of pages, and the content displayed on the screen is updated so that the portions of the display object information are enlarged and displayed on the screen according to the rule indicated by the rule information for each page of the document information.

16. The non-transitory computer readable medium according to claim 13, wherein the rule information further contains information indicating an end position corresponding to a final portion of the display object to be enlarged and displayed on the screen, and upon acceptance of the display content update operation while the final portion of the display object to be enlarged and displayed is displayed on the screen, the content displayed on the screen is not updated.

* * * * *